United States Patent
Lee et al.

(10) Patent No.: US 10,581,330 B2
(45) Date of Patent: Mar. 3, 2020

(54) METERED CHARGE TRANSFER ASSISTED SWITCHING REGULATORS

(71) Applicant: Apple Inc., Cupertino, CA (US)

(72) Inventors: Damon Lee, San Jose, CA (US); Jamie L. Langlinais, San Francisco, CA (US); Jonathan M. Audy, Monte Sereno, CA (US); Mark A. Yoshimoto, San Jose, CA (US); Rajarshi Paul, Los Gatos, CA (US); Talbott M. Houk, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/002,551

(22) Filed: Jun. 7, 2018

(65) Prior Publication Data

US 2019/0280590 A1    Sep. 12, 2019

Related U.S. Application Data

(60) Provisional application No. 62/639,824, filed on Mar. 7, 2018.

(51) Int. Cl.
| *G06F 1/28* | (2006.01) |
| *H02M 3/07* | (2006.01) |
| *H02M 3/16* | (2006.01) |

(52) U.S. Cl.
CPC ............ *H02M 3/16* (2013.01); *G06F 1/28* (2013.01); *H02M 3/07* (2013.01)

(58) Field of Classification Search
CPC .. G06F 1/26; G06F 1/28; H02M 3/00; H02M 3/02; H02M 3/04; H02M 3/06; H02M 3/07; H02M 3/16; H02M 3/18; H02M 3/20

USPC ....... 327/530, 535, 536, 537, 538, 540, 541, 327/543
See application file for complete search history.

(56) References Cited

U.S. PATENT DOCUMENTS

| 5,838,145 A * | 11/1998 | Poon ................... H02M 1/4208 323/266 |
| 9,935,546 B2 * | 4/2018 | Jatavallabhula ...... H02M 3/158 |
| 2008/0205095 A1 * | 8/2008 | Pinon ................. H02M 3/1584 363/39 |
| 2012/0001612 A1 * | 1/2012 | Cuk ....................... H02M 3/005 323/311 |
| 2013/0321076 A1 * | 12/2013 | Galbis .................. H03F 1/0216 330/127 |

(Continued)

*Primary Examiner* — William Hernandez
(74) *Attorney, Agent, or Firm* — Blank Rome LLP

(57) ABSTRACT

A power conversion circuit providing a regulated output voltage to a load can include a switching regulator with an input configured to be coupled to an input voltage source and an output configured to be coupled to the load. The power conversion circuit can further include a metered charge transfer converter, such as a charge pump or a switched or pulsed current source, having an input configured to be coupled to an input voltage source and having an output configured to be coupled to the load. A controller coupled to the metered charge transfer converter can be configured to operate the metered charge transfer converter to deliver energy to the load responsive to a dip of the regulated output voltage below a threshold caused by an increase in current drawn by the load. The metered charge transfer converter may be located closer to the load than the switching regulator.

25 Claims, 5 Drawing Sheets

(56) References Cited

U.S. PATENT DOCUMENTS

2014/0167710 A1\* 6/2014 Ingino, Jr. ................. G05F 3/08
323/223

\* cited by examiner

METERED CHARGE TRANSFER ASSISTED SWITCHING REGULATORS

BACKGROUND

Modern computing systems, particularly as used with mobile computing devices such as smartphones, tablet computers, laptop computers, etc. may operate in what may be characterized as a "bursty" mode. A bursty mode of operation means that computing element such as a central processing unit (CPU), graphics processing units (GPU), system on a chip (SoC), network adaptors, radios, and/or other components alternate between an idle state in which they draw very little power and a full load state in which they draw relatively high amounts of power. As a consequence of these rapid swings in power requirements, the currents drawn by processors may also experience large transients. These large transient currents can result in significant voltage dips in the power supplies that regulate the voltage delivered to such components.

For example, a buck converter is a commonly used switching power supply. In its simplest form, a buck converter steps down an input DC voltage to a lower, regulated level delivered to a load using a switch, a diode, an inductor, and an output capacitor. Large transient currents like those discussed above can significantly discharge the output capacitor of the buck converter, reducing the output voltage, more quickly than the switch can ramp up the current through the inductor to meet the instantaneous current demand of the load. As a result, the output voltage can dip below a minimum acceptable level for the load.

To mitigate or reduce this voltage dip, system designers have historically been forced to choose from among various power supply design techniques that have the undesirable side effect of reducing the overall efficiency of the power supply. For example, the voltage dip may be mitigated by selecting a steady state operating voltage that is sufficiently high that even a worst case voltage dip will still result in an output voltage that is above the minimum requirement for the load. However, many losses in such systems are proportional to the square of the voltage, so even a small increase in steady state operating voltage can have a significant increase on overall losses and overall system efficiency. Another alternative is to reduce the inductance of the converter. However, all else being equal, a reduced inductance may require that the inductor be operated at a higher frequency to achieve the same net energy transfer to the load. This higher operating frequency can undesirably impact switching losses, again reducing overall system efficiency.

Thus, what is needed in the art is a way to reduce the transient voltage dip associated with large changes in load on an inductor-based (i.e., magnetic) switching converter without causing an undesirable reduction in the system's efficiency.

SUMMARY

A power conversion circuit can include a switching regulator with an input configured to be coupled to a switching regulator input voltage source and an output configured to be coupled to a load and provide a regulated output voltage to the load. The power conversion circuit can further include a metered charge transfer converter having an input configured to be coupled to an input voltage source and having an output configured to be coupled to the load. A metered charge transfer converter controller can be coupled to the metered charge transfer converter and configured to operate the converter to deliver energy to the load responsive to a dip of the regulated output voltage below a threshold caused by an increase in current drawn by the load. The metered charge transfer converter may be located closer to the load than the switching regulator. In some embodiments the metered charge transfer converter may be a charge pump. In other embodiments, it may be a pulsed or switched current source.

The power conversion circuit may be a buck converter, a boost converter, or other type of switching regulator. The threshold may be selected to prevent the regulated output voltage from decreasing below a minimum voltage specified for the load. The load can be any type of electrical circuit, including a processing circuit such as a CPU or GPU or a system on a chip ("SoC"). The switching regulator input voltage source and the metered charge transfer converter input voltage source may be the same or different voltage sources, and the metered charge transfer converter input voltage source may be an output of a second switching regulator. In charge pump based embodiments, a switching capacitor of the charge pump may be selected so as to have a value that is substantially less than an output capacitance of the switching regulator, for example about 1/200th the output capacitance of the switching regulator.

In other embodiments, an integrated circuit can include an input configured to receive power from a regulated power source and one or more metered charge transfer converter components configured to receive power from the regulated power source and deliver power to a load within the integrated circuit responsive to a voltage dip of a power distribution network internal to the integrated circuit caused by an increase in current drawn by the load. The one or more metered charge transfer converter components can include one or more power switches, one or more control circuit elements, and may optionally further include one or more capacitors. In the case of multiple metered charge transfer converters, each converter may be dedicated to a load within the integrated circuit, for example, a CPU core or GPU core of the integrated circuit. The integrated circuit may be a CPU, GPU, or SoC. The metered charge transfer converter may be a charge pump or a switched or pulsed current source.

DETAILED DESCRIPTION

Figure 1:
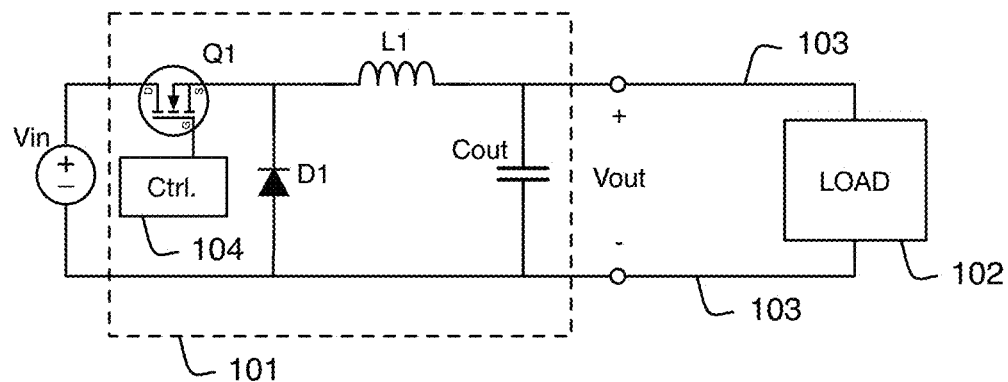
FIG. 1 depicts a switching regulator (buck converter) configured to deliver power to a load.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates an exemplary system in which a switching converter 101 delivers power to a load 102 via leads 103. Illustrated switching converter 101 is a buck converter, but other switching converter types may be used. In some embodiments, switching converter may be a magnetic-based switching converter, i.e., a converter in which there is a magnetic energy storage element such as an inductor, transformer, etc. For example, switching converter 101 may be a boost converter, a buck-boost converter, a Cuk converter, a forward converter, a flyback converter, etc. The buck converter receives input voltage Vin and operates switch Q1 to deliver current through inductor L1 to output capacitor Cout and load 102.

More specifically, when switch Q1 is closed, current flows from input voltage Vin, through inductor L1, to output capacitor Cout and load 102. This current delivers energy to load 102 and also charges output capacitor Cout. While switch Q1 is closed, diode D1 is reverse biased by input voltage Vin. When switch Q1 is opened, the current through inductor L1 cannot change instantaneously, and thus current continues to flow through L1 to load 102. However, this current will decay as energy is drawn from inductor L1. If the decaying inductor current is insufficient to provide the energy required by the load, output capacitor Cout will also discharge into load 102, reducing the output voltage. The return current path to inductor L1 passes through diode D1, which is no longer reverse biased once switch Q1 opens.

Controller 104 monitors output voltage Vout and controls switch Q1 accordingly, using any of a variety of known control techniques. For example, controller may monitor output voltage Vout and compare it to a reference voltage Vref. If Vout<Vref, controller 104 may operate switch such that more energy is transferred from input voltage source Vin to load 102, e.g., by increasing a duty cycle or switching frequency of switch Q1. Conversely, if Vout>Vref, controller 104 may operate switch such that less energy is transferred from input voltage source Vin to load 102, e.g., by decreasing a duty cycle or switching frequency of switch Q1. Various control strategies to accomplish this type of operation are known. In fact, one may purchase a variety of ready-made buck converter controllers from a variety of silicon vendors.

Figure 2:
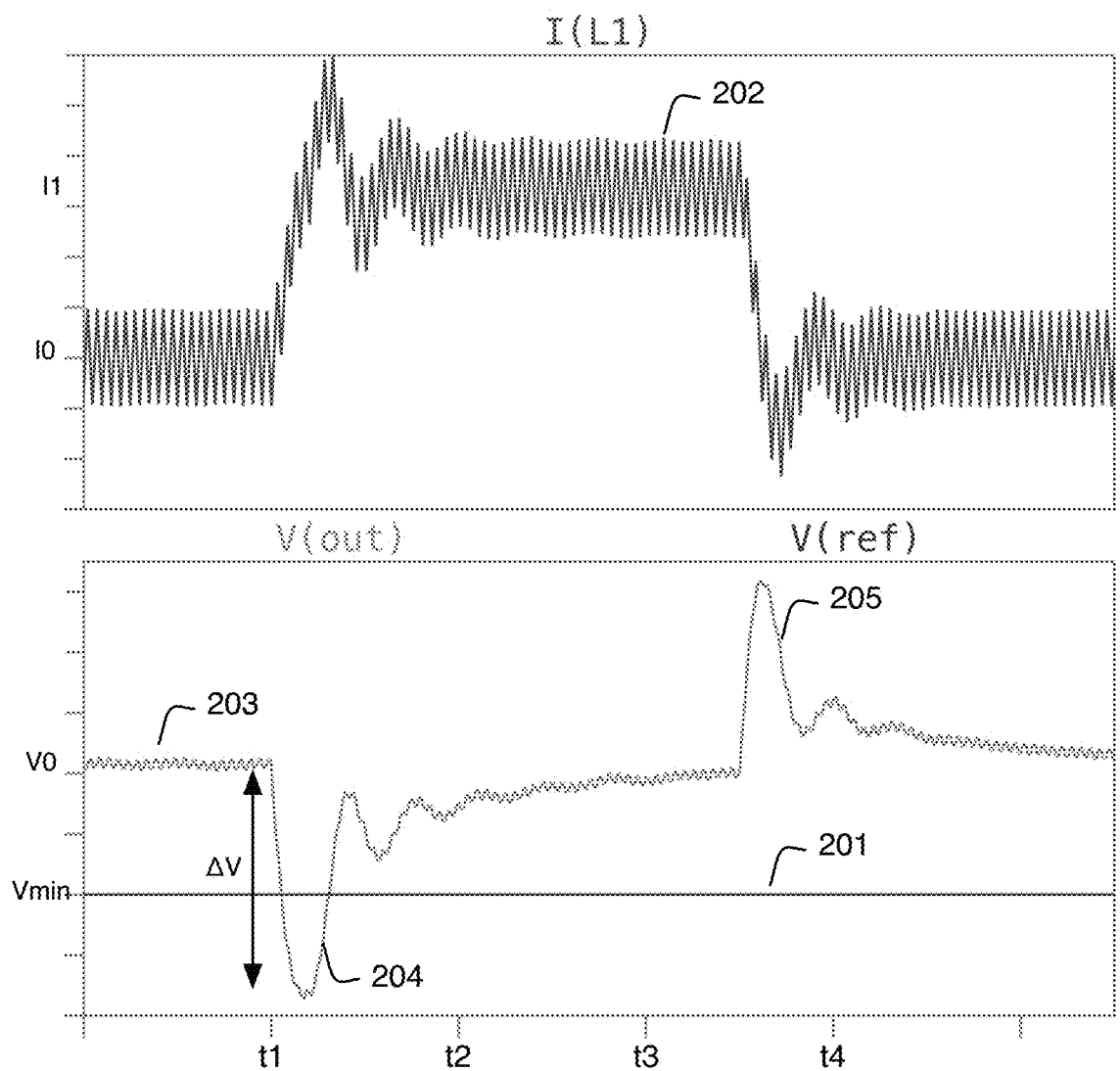
FIG. 2 depicts a series of current and voltage waveforms corresponding to certain operations of the load and switching regulator depicted in FIG. 1.

FIG. 2 illustrates various waveforms associated with a step load current increase of load 102 in the system of FIG. 1. More specifically, waveform 202 represents the current flowing through inductor L1 (denoted I(L1)). The centerline of the illustrated waveform illustrates the average load current, which starts at a current I0 and increases to I1 shortly after time t1 due to a load step. Shortly before time t4, the load current decreases from I1 back to current I0. The oscillating portion of inductor current I(L1) is a function of the switching of main switch Q1 as described above.

As alluded to above, load 102 may be a computing component such as a CPU, GPU, SoC, etc., or may be another component of an electronic device, such as a display, radio for WiFi, cellular, Bluetooth, or other data communication, etc. A load step such as that illustrated may occur as the result of a user-initiated event, a system-initiated event, or a combination of the two. For example, a user picking up a mobile telephone may be detected by an accelerometer that triggers the display to come on. Clicking on a link in a web browser may cause the radios to be activated to download the requested content and also cause the CPU and GPU to render the content for display. As another example, an incoming notification may trigger activation of the display, a loudspeaker, etc. as well as a CPU/GPU/etc. to communicate the incoming notification to the user. In any case, load 102 may transition from a first, relatively lower power state to a second, relatively higher power state—or vice-versa—as a function of the particular system and its implementation.

The lower portion of FIG. 2 illustrates voltages corresponding to the load step current discussed above. Constant DC voltage 201 is a minimum target voltage that may correspond to a minimum permissible voltage for the load. As an example, CPUs, GPUs, SoCs, etc. often specify a minimum voltage below which the processor will operate erratically or stop operating entirely. Thus, it may be incumbent on a system designer to ensure that even a worst-case transient event does not take the output voltage below this level.

Voltage waveform 203 is the output voltage Vout corresponding to the load current 202 discussed above. Thus, when load current 202 increases from I0 to I1 just after time t1, output voltage 203 experiences a corresponding dip 204 having magnitude ΔV. This voltage dip occurs as buck converter 101 attempts to maintain Vout in regulation, however, the converter's transient performance is limited by the rate at which inductor current I(L1) can slew. As illustrated, Vout eventually recovers to the nominal V0 level. However, when the load current drops back from I1 to I0 just before time t4, voltage 203 experiences an overshoot 205, again caused by the limited current slew rate of inductor L1.

Voltage dip 204 may be problematic for some loads, depending on their specification. As can be seen, the ΔV magnitude of voltage 203 takes it below the minimum voltage 201/Vmin for the load. Depending on the nature of load 102, this voltage dip might be unacceptable. Thus, a system designer would be forced to somehow modify the implementation of buck converter 101 to prevent this unacceptable voltage dip 204. As discussed above, one approach would be to shift the steady state operating voltage V0 upward, so that the voltage drop ΔV resulted in voltage waveform 203 remaining above minimum voltage 201 at all times. This may be undesirable because of an increase in leakage losses, which are proportional to the square of the average voltage. Alternatively, another approach would be to decrease the size of inductor L1, so that the current I(L1) can slew faster. However, this would require an increased switching frequency to deliver the same amount of power/energy to the load, and this increased switching frequency would result in increased losses. Both forms of increased losses are undesirable for mains-powered systems, but become even more undesirable in battery-powered systems, in which such increased losses can have a significant adverse impact on device run time available from the battery.

Figure 3A:
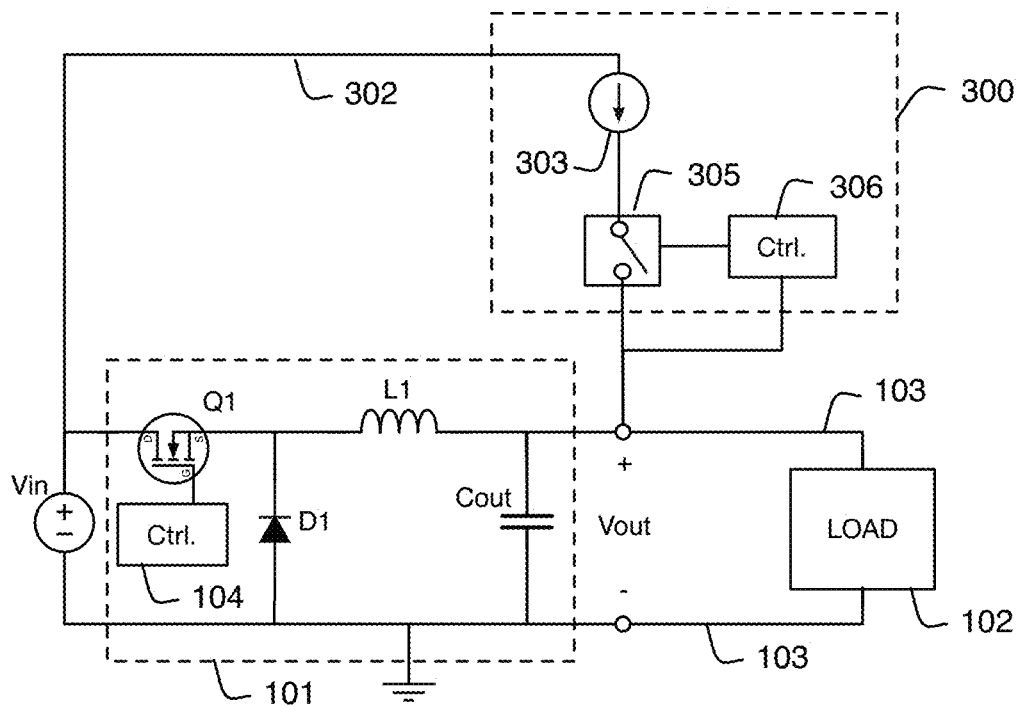
FIG. 3A depicts a metered charge transfer converter assisted switching regulator (buck converter) configured to deliver power to a load in which the metered charge transfer converter is a pulsed current source.
Figure 3B:
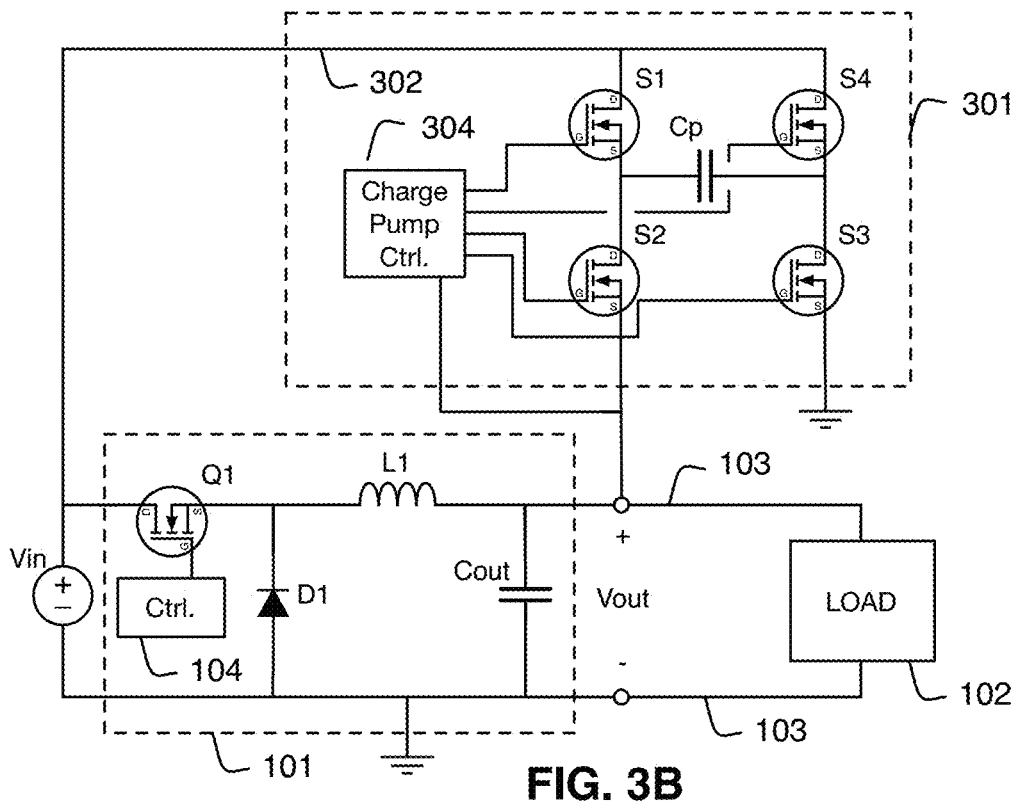
FIG. 3B depicts a metered charge transfer converter assisted switching regulator (buck converter) configured to deliver power to a load in which the metered charge transfer converter is a charge pump.

FIGS. 3A and 3B illustrate power supply systems incorporating a switching regulator 101 (in this case a buck converter like that described above) and a metered charge transfer converter 301 configured to power a load 102. In the embodiment of FIG. 3A, the metered charge transfer converter is a switched or pulsed current source 301a. In the embodiment of FIG. 3B, the metered charge transfer converter is a charge pump 301b. A desirable characteristic of the metered charge transfer converter is that it be capable of rapidly delivering a precisely controlled (i.e., metered) amount of charge (energy) to the output of the switching regulator. The illustrated power supply system may be used to reduce the transient voltage dip associated with a rapid step increase in load current by load 102.

Although the following description primarily refers to the particular buck topology and charge pump topology illustrated in FIG. 3B, it will be appreciated that other switching converter types and configurations, as well as other metered charge transfer converter circuit configurations could be used in the same manner. As will become more apparent below, in some embodiments it may be desirable for the metered charge transfer converter to be constructed as a non-magnetic converter (i.e., lacking a magnetic energy storage element such as an inductor, transformer, etc.). One potential advantage of a non-magnetic metered charge transfer converter can be decreased physical volume, as the energy density of capacitive energy storage elements may be higher than the energy density of inductive energy storage elements. Another potential advantage of a non-magnetic metered charge transfer converter is that its components may be built as part of an integrated circuit, and particularly may be built into the integrated circuit of a load, such as a CPU, GPU, SoC, etc.

With reference to FIG. 3A, metered charge transfer converter 300 is embodied as a switched or pulsed current source that includes a current source 303 and a switching device 305 that may selectively couple current source 303 to load 102. Metered charge transfer converter 300 receives input voltage Vin via input voltage rail 302. In the illustrated embodiment, charge pump 301 is coupled to the same input source as buck converter 101, though it could alternatively have its own independent input source. Switch 305 may be selectively operated by a controller 306 to close the switch responsive to a voltage dip, increased current, or a slew rate (i.e., derivative) or integrated output voltage or current at the output of switching converter 101. Because the current output by current source 303 is substantially constant, the amount of time that switch 305 is closed will determine the amount of charge (energy) that is transferred to the load (and/or switching regulator 101's output capacitor Cout). Thus, switch timing (under the direction of controller 306) can result in a transfer of a metered amount of charge (energy) to the load and/or output capacitor Cout.

With reference to FIG. 3B, metered charge transfer converter 300 may be implemented as a charge pump 301. Charge pump 301 includes a charge pump capacitor Cp (i.e., a switched capacitor), four switching devices S1-S4, and a charge pump controller 304. The charge pump receives input voltage Vin via input voltage rail 302 coupled to switches S1 and S4. In the illustrated embodiment, charge pump 301 is coupled to the same input source as buck converter 101, though it could alternatively have its own independent input source. Input voltage rail 302 is coupled to the drain terminals of MOSFET switches S1 and S4, though other switching device types could be used. Charge pump capacitor Cp is coupled between the source terminals of switches S1 and S2. Additionally, drain terminals of switches S2 and S3 are coupled to charge pump capacitor Cp and to the source terminals of switches S1 and S4. A source terminal of switch S2, which is the output of charge pump 301, is coupled to the output terminal of buck converter 101 and load 102. A source terminal of switch S3 is coupled to ground. Finally, the output voltage terminal of buck converter 101 is coupled to the charge pump controller 304, which also has gate drive connections to switches S1-S4.

Figure 4:
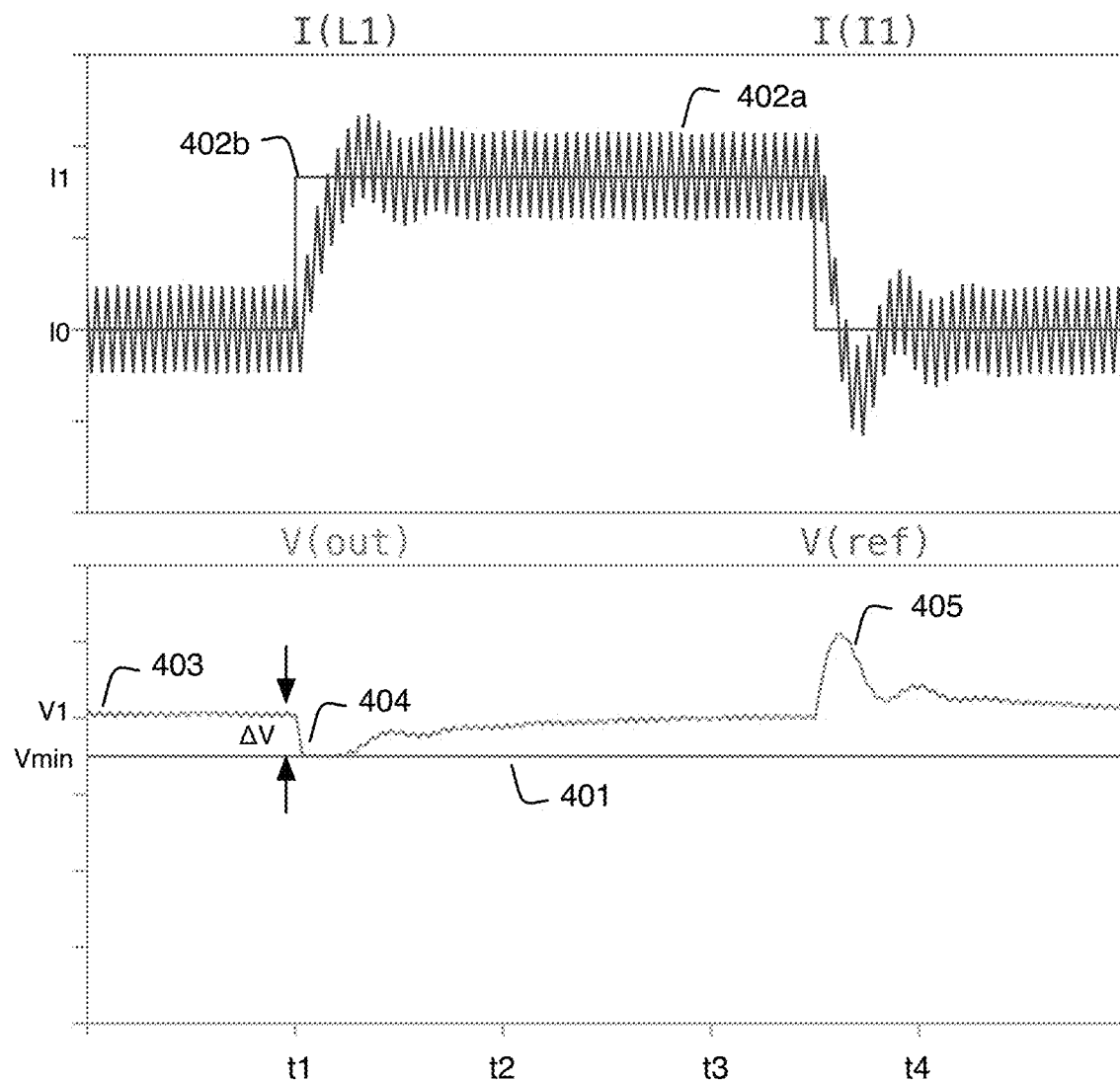
FIG. 4 depicts a series of current and voltage waveforms corresponding to certain operations of the charge pump assisted switching regulator depicted in FIG. 1.

An exemplary embodiment of charge pump controller 304 is discussed in greater detail below with respect to FIG. 5. Functionally, charge pump 301 may operate as follows. Switches S1 and S3 may be closed, which charge capacitor Cp to a voltage Vin. Switches S1 and S3 may then be opened, with charge pump capacitor Cp remaining charged. If load 102 exhibits a step load that causes voltage Vout to drop below a threshold determined by charge pump controller 304, switches S2 and S4 may be closed, which allows charge pump capacitor to discharge into load 102 and/or buck converter output capacitor Cout, minimizing the voltage dip associated with the step load. Waveforms associated with the operation of the system illustrated in FIG. 3B are illustrated in FIG. 4. The same basic operating principles apply to the controller 306 of FIG. 3A.

In other embodiments, charge pump controller may charge the output based on other parameters instead of or in addition to the dip of output voltage Vout below a threshold. For example, a band pass filtered slope detection on the output voltage may be used to trigger the charge pump. When output voltage Vout slews down too fast (i.e., faster than a predetermined rate threshold), charge pump 301 may be configured to inject charge into the buck converter output capacitor Cout using switches S2 and S4. As the output voltage recovers, and the slope turns shallow, controller 304 may stop firing the charge pump (stopping the charging of the output) by opening the switches S2 and S4. More generally, charge pump 301 may be triggered (by controller 304) to charge the output in response to one or more parameters including output voltage, output slew rate, voltage error, and/or an integrated value of one or more of these parameters. In other words, the charge pump may be controlled using any proportional, integral, and/or derivative (PID) controller responding to any parameter characterizing the output of the circuit. Although the following examples focus on the case in which the charge pump is controlled responsive to the output voltage, it is to be understood that any combination of the foregoing parameters could also be used as controller inputs. Again, the same principles may be employed with respect to controller 306 of FIG. 3A.

With reference now to FIG. 4, waveform 402 represents the current flowing through inductor L1 (denoted I(L1)). The centerline of the illustrated waveform illustrates the average load current, which starts at a current I0 and increases to I1 shortly after time t1 due to a load step. Shortly before time t4, the load current decreases from I1 back to current I0. The oscillating portion of inductor current I(L1) is a function of the switching of main switch Q1 as described above. Current waveform 402b is the load current I(I1), which exhibits the type of step operation described above.

The lower portion of FIG. 4 illustrates voltages corresponding to the load step current discussed above. Constant DC voltage 401 is a minimum target voltage that may correspond to a minimum permissible voltage for the load. Voltage waveform 403 is the output voltage Vout corresponding to the load current 402 discussed above. Thus, when load current 402 increases from I0 to I1 just after time t1, output voltage 403 experiences a corresponding dip 404 having magnitude ΔV. This voltage dip occurs as buck converter 101 attempts to maintain Vout in regulation. As before, the converter's transient performance is limited by the rate at which inductor current I(L1) can slew. However, because charge pump 301 detects a dip of output voltage Vout below a predetermined threshold, it can discharge its capacitor Cp (one time or many times) to help support the output voltage. As a result, the voltage dip ΔV is minimized.

As illustrated, Vout eventually recovers to the nominal V1 level. However, when the load current drops back from I1 to I0 just before time t4, voltage 403 experiences an overshoot 405, again caused by the limited current slew rate of inductor L1. Charge pump 301 may be configured and operated to absorb some of this excess energy from buck converter inductor L1, minimizing the voltage overshoot 405.

As can be seen in FIG. 4, because charge pump 301 is available to support output voltage Vout, the steady state operating voltage V1 can be much closer to minimum acceptable output voltage Vmin. This can substantially improve the operating efficiency of a system such as that illustrated in FIG. 3 as compared to the arrangement illustrated in FIG. 1. For example, leakage losses are proportional to the square of the voltage, so a 10% reduction in steady state operation voltage (e.g., from V0 illustrated in FIG. 2 to V1 illustrated in FIG. 4) can result in a 20% improvement in leakage losses. By comparison, substantial engineering efforts, and sometimes also substantially increased costs, are required to provide even a 1% efficiency improvement in conventional inductor-based switching regulators. Thus, providing a charge pump in tandem with an inductor-based switching regulator can provide substantially improved efficiency.

To understand the synergistic benefits of metered charge transfer converter assisted switching regulators, it is useful to consider the differences between the exemplary magnetic (i.e., inductor-based) switching regulators and the exemplary charge pumps. As compared to charge pumps (or other forms of non-magnetic metered charge transfer converters), magnetic switching regulators may be more efficient for a given power level. However, as discussed above, magnetic switching regulators may have less rapid transient response, unless the inductor sizes are reduced and switching frequencies are increased, which negates some of their efficiency advantage. Conversely, as compared to magnetic switching regulators, charge pumps (or other forms of metered charge transfer converters, including non-magnetic metered charge transfer converters) may be less efficient for a given power level. However, charge pumps can have extremely rapid response times. By providing a magnetic switching regulator and fast operating metered charge transfer converter, such as a charge pump, operating in tandem, the steady-state efficiency advantages of the magnetic switching regulator may be realized in steady state operation. In these steady state conditions, the charge pump (or other metered charge transfer converter) need not be in operation, thus overcoming its efficiency disadvantage. However, when a large load transient necessitates improved transient response, the advantages of the charge pump (or other fast operating metered charge transfer converter) may be realized, without significant efficiency penalty because of the limited amount of time that the charge pump is in operation.

Figure 5:
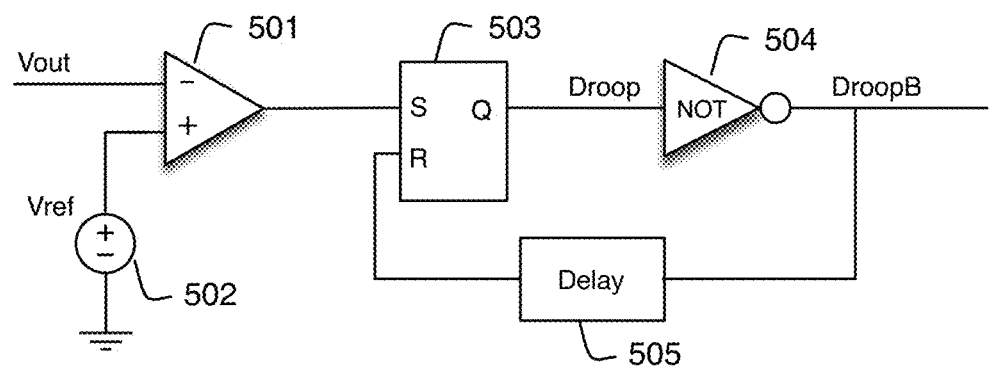
FIG. 5 schematically depicts a charge pump controller of a charge pump assisted switching regulator like that illustrated in FIG. 3.

FIG. 5 schematically illustrates an embodiment of charge pump controller 304. Output voltage Vout (FIG. 3B) is provided to one input of comparator 501. A reference voltage source 502 provides a reference voltage Vref to the other input of comparator 501. This reference voltage is the reference voltage that will trigger discharge of charge pump capacitor Cp to the output terminal of buck converter 101 and load 102. Thus, Vref should be selected to be sufficiently below the nominal operating output voltage of switching regulator 101 that the charge pump will not fire unnecessarily, i.e., for load transients that are within the ability of switching regulator 101 to maintain sufficient output regulation. However, Vref must be selected to be sufficiently above the minimum operating voltage of the load (Vmin) that the charge pump will have sufficient time and energy delivery capability to prop up output voltage Vout before the load transient causes output voltage Vout to dip below Vmin.

Whenever Vout dips below the reference voltage Vref, the output of comparator 501 will transition high, which activates the "set" or S terminal of flip flop 503. This causes the "output" or Q terminal of flip flop 503 to transition high. The output terminal Q of flip flop 503 may be the signal (Droop) that triggers switches S4 and S2 to turn on, allowing charge pump capacitor Cp to discharge, delivering energy to load 102 and/or switching regulator 101's output capacitor Cout. The Droop signal may also be provided to inverter 504, which creates the inverse signal DroopB, which may be the signal used to trigger switches S1 and S3 to turn on, charging charge pump capacitor Cp. This DroopB signal may also be passed through delay element 505 and returned to the "reset" terminal R of flip flop 503. Delay 505 may be configured to allow sufficient time for the discharge of charge pump capacitor Cp before resetting flip flop 503, which de-asserts the droop signal, causing DroopB to go high, allowing the charge pump to recharge. If Vout is still less than Vref, the cycle will repeat, continuing to charge/discharge charge pump 301 until the output voltage is above Vref. (It should be understood that additional circuit elements, such as additional delays, gate drive circuitry for switches S1-24, etc., may be required in a given implementation. The selection and/or design of these components is within the abilities of the ordinarily skilled artisan having the benefit of this disclosure.)

Additional design considerations may be addressed in the design of charge pump 301. One such consideration is the size (i.e., capacitance value) of charge pump capacitor Cp. The size of this capacitor, together with, the input voltage Vin supplied to charge pump 301 will determine the amount of energy that can be delivered to load 102 with each firing of the charge pump, as well as the amount of time required to charge and discharge the charge pump. The inventors have determined that capacitor Cp may have a capacitance that is substantially less than the output capacitance of switching regulator/buck converter 101 (Cout). Specifically, in some embodiments Cp may be about $1/200^{th}$ the value of Cout. That said, Cp may, depending on system requirements and desired operation, be in a range of $1/10^{th}$ the value of Cout to $1/1000^{th}$ the value of Cout. In some embodiments, even relatively smaller capacitance values for Cp may be used.

Another design consideration, which is related to the capacitance value of charge pump capacitor Cp, is amount of energy that will be transferred with each firing of the charge pump and the number of firings that will be expected for a given transient. To address this consideration, it is useful to further consider that the converter system illustrated in FIG. 3B is intended to have the switching regulator/buck converter 101 operate as the primary source of regulation for output voltage Vout, with charge pump 301 only providing assistance with transients as required. Thus, it may be advantageous to avoid a situation in which charge pump 301 delivers sufficient energy to completely meet the transient requirements of load 102, as this could cause the controller of switching converter/buck regulator 104 to "give up" and allow the charge pump to take over. (This condition could incur a significant efficiency penalty as well as lead to system stability issues.) In an even more severe case, if the charge pump delivered more than the transient requirements of the load, output voltage Vout would go above the setpoint/reference voltage used by controller 104, causing switching regulator/buck converter 104 to reduce the amount of power delivered to the load. This would be counterproductive, as the switching regulator and charge pump would end up fighting one another.

Thus, in some embodiments, it may be desirable to have charge pump 301 deliver relatively small amounts of energy, and fire multiple times in response to a given transient, rather than deliver a single, decisive large pulse in response to such a transient. This consideration, in part, drives the relatively small capacitance values of charge pump capacitor Cp relative to switching regulator/buck converter 101's output capacitor Cout as discussed above. In such a system, multiple, rapid operations of charge pump 301 will assist switching regulator 101 with maintaining output regulation, while still allowing controller 104 to see an error signal of sufficient magnitude and correct direction that it continues to "pull the laboring oar" with respect to maintaining output regulation. As a further extension of this idea of providing many rapid but small bursts of energy from the charge pump to assist the switching regulator, it may be desirable to have more than one charge pump assisting a switching regulator. In such an embodiment, the charge pumps may be operated alternately, or even simultaneously to assist in reducing voltage dips as described above. Construction of such multi-charge pump systems follows the basic principles outlined above, and would be within the capabilities of an ordinarily skilled artisan having the benefit of this disclosure.

Still another consideration is the source of the input voltage for charge pump 301 (or switched or pulsed current source 300). In the embodiments of FIGS. 3A and 3B, switched or pulsed current source 300 and charge pump 301 are illustrated as receiving the same unregulated input voltage Vin as switching regulator/buck converter 101. However, it may be desirable for the metered charge transfer converters 300, 301 to receive as their input voltage the regulated output voltage of a separate converter. In the charge pump based embodiment of FIG. 3B, the voltage to which charge pump capacitor Cp is charged, and thus the energy that is delivered to load 102 with each firing of the charge pump, is directly related to this voltage. Similarly, maintaining current source 303 at a constant current is more challenging of it does not receive a well-regulated input voltage. Thus, in either case, control of the system becomes more complex if the input voltage of the metered charge transfer converter is not sufficiently tightly regulated. Thus, providing an additional regulator for the metered charge transfer converter's input voltage may lead to improved system operation. This additional regulator may be any of a variety of types. For example, a separate buck regulator, boost regulator, buck-boost regulator, or other regulator type may be provided depending on the system design and the ultimate power source of the system.

A metered charge transfer assisted switching converter may be advantageously employed as part of a point of load regulator system. Point of load regulators place the converter/regulator components in close physical proximity to the load to be supplied. This arrangement can reduce or eliminate the voltage drop and other undesirable electrical effects caused by the parasitic properties (resistivity and parasitic inductance and/or capacitance) of relatively long electrical connections (wires, PCB traces, etc.) between the converter/regulator and its load. While point of load regulators have been a known solution to provide improved voltage regulation, packaging constraints with many modern compact electronic devices sometimes make it impractical or impossible to locate converter/regulator components near their load. This may be especially true with respect to magnetic components, such as inductors, coupled inductors, transformers, because they may be much larger than other circuit components. However, a metered charge transfer assisted switching converter may overcome this issue by locating the magnetic-based switching converter farther away from the load, but locating the metered charge transfer converter (which may be made up only of relatively more compact switches and capacitors) located nearer the load.

Figure 6A:
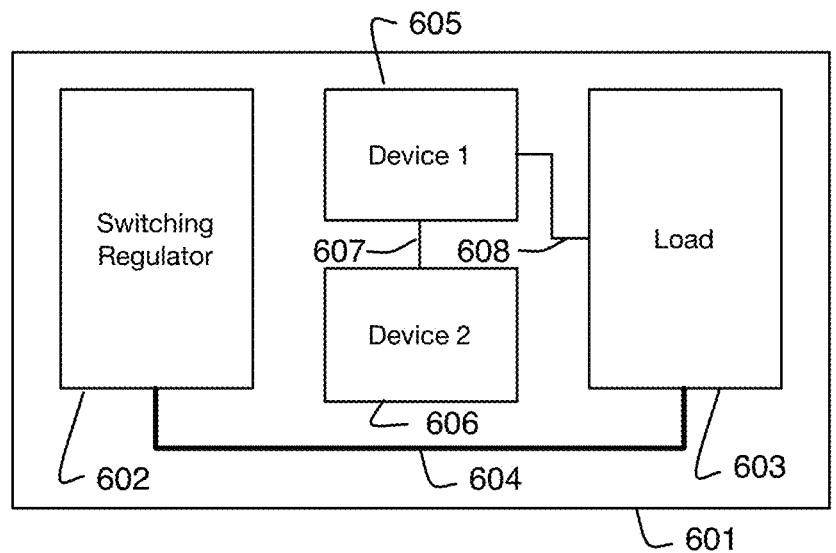
FIG. 6A depicts a PCB layout.
Figure 6B:
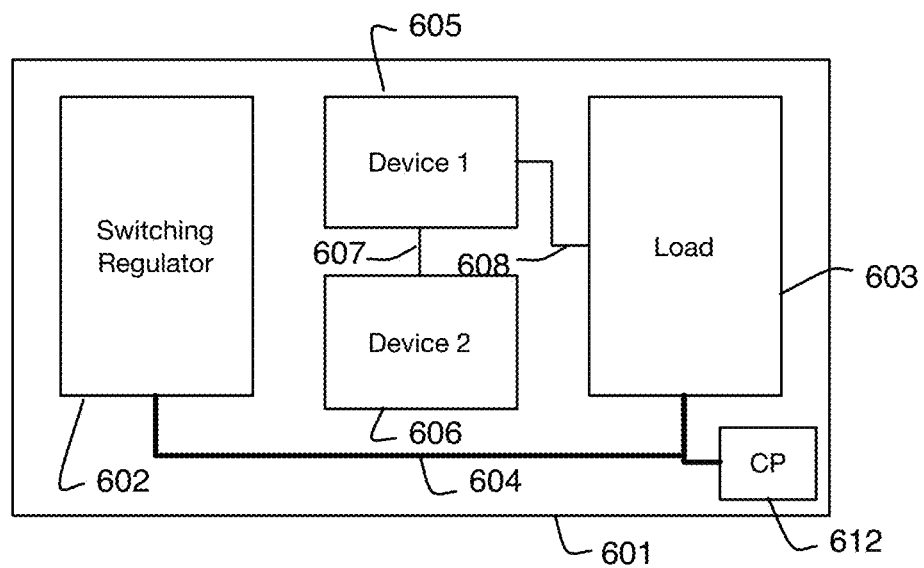
FIG. 6B depicts a PCB layout with a metered charge transfer converter assisted switching regulator located near the load in which the metered charge transfer converter is a charge pump.

A example of such an arrangement, using a charge pump for the metered charge transfer converter, is illustrated in FIGS. 6A and 6B. FIG. 6A is a simplified diagram of a printed circuit board 601. Disposed on printed circuit board 601 is a switching regulator 602 that powers a load 603 via a power distribution network 604. Switching regulator 602 may be any of a variety of types of switching regulators, such as a buck converter, boost converter, buck-boost converter, etc. Load 603 may be any of a variety of electronic devices, circuits, processors, etc. In some embodiments Load 603 may be a CPU, GPU, SoC, or other electronic device that exhibits significant step load behaviors. Load 603 may also be connected to external device 605 via connection 608, which is in turn connected to device 606 via connection 607. Devices 605 and 606 may also be located on printed circuit board 601. Interconnections 607 and 608, as well as power distribution network 604 may take the form of traces on the printed circuit board. In alternative embodiments, these may be wires or other known means for providing electrical connections between electronic devices.

As depicted in FIG. 6A, design considerations for the layout of printed circuit board 601 may result in switching regulator 602 and load 603 being located some distance from one another. These design considerations could include physical arrangement or spatial requirements of the overall electronic device in which printed circuit board 601 is located, electromagnetic interference issues, or other considerations. In any case, the result is that power distribution network 604 requires a longer path than if load 603 and switching regulator 602 were located in closer physical proximity. As a result, the resistance of power distribution network 604 may be increased, and there may be parasitic inductances and/or capacitances associated with the physical structure of power distribution network 604. These electrical properties may exacerbate a voltage dip associated with a step load increase in the power requirements of load 603. As a consequence, switching regulator 602 may need to be configured to operate at a higher steady state voltage to prevent the voltage at load 603 from dropping below a specified minimum value. This can have the undesirable efficiency effects described above.

FIG. 6B illustrates a similar arrangement in which switching regulator 602 is assisted by a charge pump 612, which is located physically closer to load 603 than switching regulator 602 is. (It will be appreciated that charge pump 612 could alternatively be another type of metered charge transfer controller, such as the switched or pulsed current source discussed above.) Charge pump 612 may be configured to operate in conjunction with switching regulator 602 as described above. Locating charge pump 612 closer to load 603 may be feasible because charge pump 612 may composed of switching devices and capacitors, which tend to be more compact for a given power or energy handling level than inductors or magnetic components. In some cases, EMI considerations may also allow for placing the switching devices and capacitors of charge pump 612 closer to load 603. In any event, the effect of locating charge pump 612 closer to load 603 than switching regulator 602 is to load 603 is that charge pump 612 can quickly respond to load transients as described above preventing the voltage seen at load 603 from dropping below a specified minimum value.

Figure 7A:
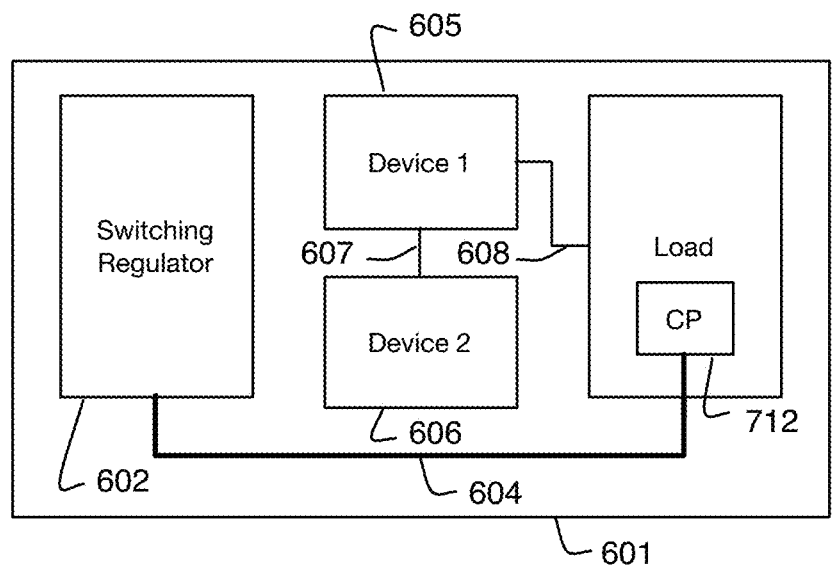
FIG. 7A depicts a metered charge transfer converter assisted switching regulator in which the metered charge transfer converter is a charge pump integrated with the load.

In some embodiments, it may be desirable to integrate a charge pump (or other metered charge transfer converter) configured to assist a switching regulator within a load itself. As an example, charge pumps are made up of switching devices (both for the power switches and control logic) and capacitances. These structures may be readily constructed as part of an integrated circuit that makes up a CPU, GPU, SoC or other integrated circuit load. FIG. 7A illustrates such an embodiment, which is similar to that illustrated in FIG. 6B, except that charge pump 712 has been integrated within load 603. Depending on the specific requirements and implementation, all of charge pump 712 may be integrated within load 603, or only the switching components (i.e., the power switches and controller) may be integrated within load 603, with the charge pump capacitor being external to load 603. In either case, the charge pump may receive power from an input voltage source, such as a switching regulator, located outside the integrated circuit, via an input power pin of the integrated circuit. The charge pump may be configured to deliver power to one or more circuits within the integrated circuit, including one or more processing circuits, such as a CPU or GPU, or other types of circuits that may experience significant step load changes in operation. Similar principles apply to other types of metered charge transfer converters.

Figure 7B:
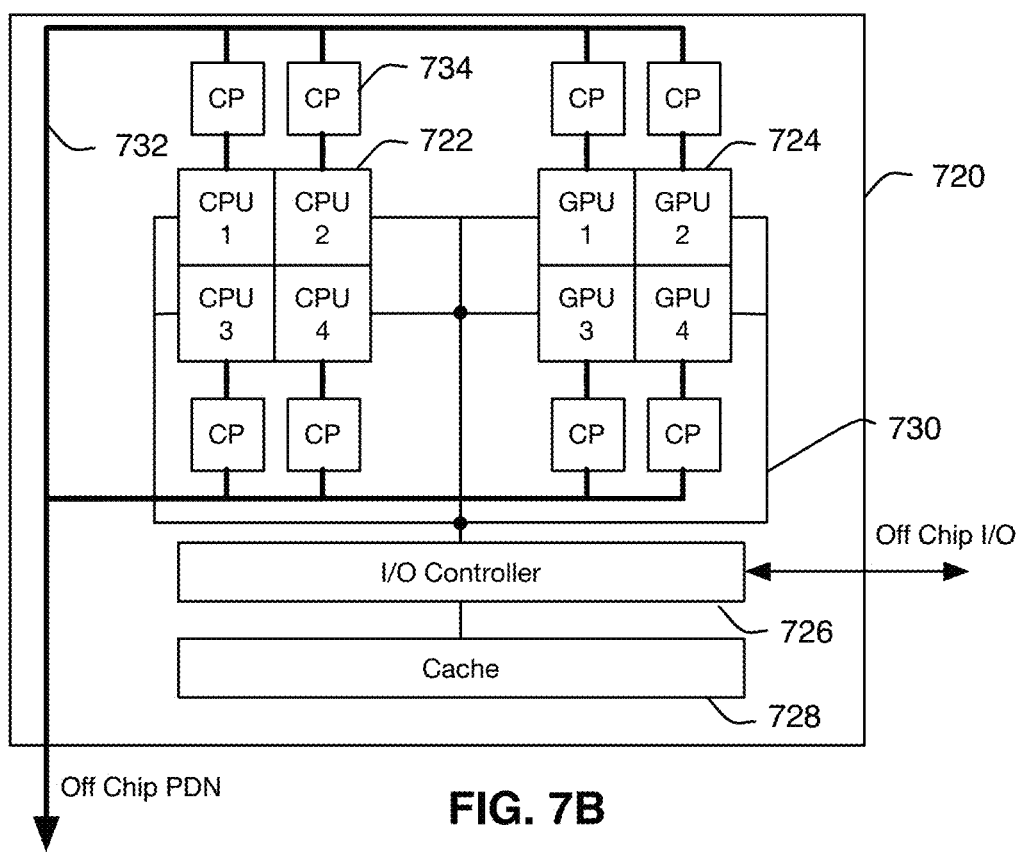
FIG. 7B depicts a metered charge transfer converter assisted switching regulator in which a plurality of charge pumps are integrated with individual point loads within a SoC.

FIG. 7B illustrates a further variation on the embodiment of FIG. 7A, in which load 603 can have multiple charge pumps (or other metered charge transfer converters) integrated within load 603 to prevent localized dips within the load itself. FIG. 7B is a simplified block diagram of an SoC 720. SoC 720 includes a multi-core CPU 722, a multi-core GPU 724, an I/O controller 726, and cache memory 728 all interconnected by communication busses 730. It is understood that a real-world SoC implementation may include more components and more complex arrangements, but the foregoing description is simplified for the purposes of illustrating the use of a metered charge transfer assisted switching converter integrated with an SoC. To that end, a number of charge pumps 734 are used to couple the on chip power distribution network 732 to some of the individual loads within the SoC, in the illustrated example each core of CPU 722 and each core of GPU 724. The charge pumps 734 may cooperate with a switching regulator located off chip (to which SOC 720 is coupled via the off chip PDN). Because a charge pump (or other metered charge transfer converter) is located in close proximity to a number of distinct loads within the SoC, e.g., the CPU cores and the GPU cores, the charge pumps can also help to avoid voltage dips caused by the parasitic impedances of the on chip power distribution network (PDN). This can extend the advantages discussed above to the on chip PDN as well.

Described above are various features and embodiments relating to power converters incorporating charge pump assisted switching regulators. Such converters may be used in a variety of applications, but may be particular advantageous when used in conjunction with point of load regulators, on-chip regulators, and/or other power supply solutions for use in conjunction with portable electronic devices such as mobile telephones, smart phones, tablet computers, laptop computers, media players, and the like, as well as the peripherals associated therewith. Such associated peripherals can include input devices (such as keyboards, mice, touchpads, tablets, microphones and the like), output devices (such as headphones or speakers), combination input/output devices (such as combined headphones and microphones), storage devices, or any other peripheral.

Additionally, although numerous specific features and various embodiments have been described, it is to be understood that, unless otherwise noted as being mutually exclusive, the various features and embodiments may be combined in any of the various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:
1. A power conversion circuit comprising:
    a switching regulator having an input configured to be coupled to a switching regulator input voltage source and an output configured to be coupled to a load and provide a regulated output voltage to the load;
    a metered charge transfer converter including a switched or pulsed current source or a charge pump having an input configured to be coupled to a metered charge transfer converter input voltage source and having an output configured to be coupled to the load;
    a metered charge transfer converter controller coupled to the metered charge transfer converter and configured to operate the metered charge transfer converter to deliver energy to the load responsive to an increase in current drawn by the load.

2. The power conversion circuit of claim 1 wherein the switching regulator comprises a magnetic element.

3. The power conversion circuit of claim 2 wherein the magnetic element is an inductor.

4. The power conversion circuit of claim 1 wherein the metered charge transfer converter is a non-magnetic converter.

5. The power conversion circuit of claim 1 wherein the metered charge transfer converter controller is configured to operate the metered charge transfer converter to deliver energy to the load responsive to a dip of the regulated output voltage below a threshold.

6. The power conversion circuit of claim 5 wherein the threshold is selected to prevent the regulated output voltage from decreasing below a minimum voltage specified for the load.

7. The power conversion circuit of claim 1 wherein the metered charge transfer converter controller is configured to operate the metered charge transfer converter to deliver energy to the load responsive to a slew rate of the regulated output voltage above a slew rate threshold.

8. The power conversion circuit of claim 1 wherein the load is a CPU or GPU.

9. The power conversion circuit of claim 1 wherein the load is an SoC.

10. The power conversion circuit of claim 1 wherein the switching regulator input voltage source and the metered charge transfer converter input voltage source are different voltage sources.

11. The power conversion circuit of claim 10 wherein the metered charge transfer converter input voltage source is an output of a second switching regulator.

12. An integrated circuit comprising:
an input configured to receive power from a regulated power source;
one or more metered charge transfer converter components, including at least a switched or pulsed current source or a charge pump, configured to receive power from the regulated power source and deliver power to at least one load within the integrated circuit responsive to an increase in current drawn by the load.

13. The integrated circuit of claim 12 wherein the one or more metered charge transfer components are configured to deliver power to the load responsive to a voltage dip below a threshold.

14. The integrated circuit of claim 13 wherein the threshold is selected to prevent the regulated output voltage from decreasing below a minimum voltage.

15. The integrated circuit of claim 12 wherein the one or more metered charge transfer converter components are configured to deliver power to the load responsive to a slew rate of a regulated output voltage above a slew rate threshold.

16. The integrated circuit of claim 12 wherein the one or more metered charge transfer converter components comprise one or more charge pump power switches and one or more charge pump control circuit elements.

17. The integrated circuit of claim 16 wherein the one or more metered charge transfer converter components further comprise one or more charge pump capacitors.

18. The integrated circuit of claim 12 wherein the one or more metered charge transfer converter components comprise a plurality of charge pumps, each charge pump dedicated to one of the at least one loads within the integrated circuit.

19. The integrated circuit of claim 18 wherein the load is a CPU core or GPU core of the integrated circuit.

20. A power supply circuit comprising:
a buck converter configured to receive power from a buck converter input power source and deliver a regulated output voltage to a load;
a charge pump configured to receive power from a charge pump input power source and deliver energy to the load responsive to an increase in current drawn by the load;
wherein the charge pump is located closer to the load than the buck converter.

21. The power supply circuit of claim 20 wherein the charge pump is configured to deliver energy to the load responsive to a dip of the regulated output voltage below a threshold.

22. The power supply circuit of claim 21 wherein the threshold is selected to prevent the regulated output voltage from decreasing below a minimum voltage specified for the load.

23. The power supply circuit of claim 20 wherein the charge pump is configured to deliver energy to the load responsive to a slew rate of the regulated output voltage above a slew rate threshold.

24. The power supply circuit of claim 20 wherein a switched capacitor of the charge pump has a value that is substantially less than an output capacitance of the buck converter.

25. The power supply circuit of claim 24 wherein the switched capacitor of the charge pump has a value of about 1/200th the output capacitance of the buck converter.

* * * * *